US012111025B2

(12) United States Patent
Ogaki

(10) Patent No.: US 12,111,025 B2

(45) Date of Patent: Oct. 8, 2024

(54) LIGHTING APPLIANCE TUBULAR BODY AND PORTABLE LIGHTING APPLIANCE

(71) Applicant: NICHIA CORPORATION, Anan (JP)

(72) Inventor: Naoto Ogaki, Yokohama (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/454,790

(22) Filed: Aug. 24, 2023

(65) Prior Publication Data

US 2024/0068629 A1 Feb. 29, 2024

(30) Foreign Application Priority Data

Aug. 25, 2022 (JP) ................................ 2022-133974

(51) Int. Cl.

*F21L 4/00* (2006.01)
*F21V 15/01* (2006.01)
*F21Y 115/30* (2016.01)

(52) U.S. Cl.

CPC .............. *F21L 4/005* (2013.01); *F21V 15/01* (2013.01); *F21Y 2115/30* (2016.08)

(58) Field of Classification Search

CPC ........ F21Y 2115/30; F21V 15/01; F21L 4/005
See application file for complete search history.

(56) References Cited

U.S. PATENT DOCUMENTS

| | | | | |
|---|---|---|---|---|
| 2001/0012204 A1* | 8/2001 | Sharrah | F21L 4/08 | 362/205 |
| 2004/0095759 A1* | 5/2004 | Koch | F21V 23/0414 | 362/205 |
| 2015/0300616 A1 | 10/2015 | Buhl | | |
| 2016/0153646 A1* | 6/2016 | Maglica | F21V 7/0075 | 362/208 |

FOREIGN PATENT DOCUMENTS

| | | | | |
|---|---|---|---|---|
| CN | 203147299 U * | 8/2013 | F21L 4/005 |
| CN | 106764576 A * | 5/2017 | F21L 4/005 |
| CN | 116838982 A * | 10/2023 | |
| JP | 58-106801 U | 7/1983 | |
| JP | 06-050101 U | 7/1994 | |
| JP | 2016-503225 | 2/2016 | |
| JP | 2016-071934 | 5/2016 | |
| WO | WO-2021034515 A1 * | 2/2021 | F21L 4/00 |

OTHER PUBLICATIONS

Innovation Q+ NPL Search (Year: 2024).*

* cited by examiner

*Primary Examiner* — Anabel Ton

(74) *Attorney, Agent, or Firm* — MORI & WARD, LLP

(57) ABSTRACT

A lighting appliance tubular body includes a first tubular body and a second tubular body. The first tubular body including a first member, a second member, and a first connecting portion on one opening side. The second tubular body including a first holding portion that holds the first connecting portion. The first member includes a first lateral wall portion that is configured to cover part of a circuit board accommodated inside, and a first divided connecting portion continuous with the first lateral wall portion and part of the first connecting portion. The second member includes a base on which a light source is placed, a second lateral wall portion that is continuous from the base to form the lateral wall and covers part of the circuit board, and a second divided connecting portion that is continuous with the second lateral wall portion and is part of the first connecting portion.

20 Claims, 5 Drawing Sheets

LIGHTING APPLIANCE TUBULAR BODY AND PORTABLE LIGHTING APPLIANCE

CROSS-REFERENCE TO RELATED APPLICATION

This application is based upon and claims priority to Japanese Patent Application No. 2022-133974, filed on Aug. 25, 2022, the entire content of which is incorporated herein by reference.

BACKGROUND

The present disclosure relates to a lighting appliance tubular body and a portable lighting appliance.

In Japanese Patent Publication No. 2016-503225, a portable lighting appliance, which is carried by a user and emits light, is configured such that, for example, a tubular body on a light source side and a tubular body on a power supply side are detachable from each other. Since a plate for operating the light source is disposed in the tubular body on the light source side, it is necessary to form an opening that can accommodate the plate, and a size of the tubular body on the power supply side needs to be adjusted to a size of the tubular body on the light source side.

Thus, it has been determined that a lighting appliance tubular body and a portable lighting appliance is needed that can be miniaturized.

SUMMARY

A lighting appliance tubular body disclosed in the embodiment includes a first tubular body including a first member and a second member, having a tubular shape when the first member and the second member are combined, and including a first connecting portion on one opening side of the tubular shape; and a second tubular body having a tubular shape, the second tubular body including a first holding portion that holds the first connecting portion of the first tubular body and accommodating a power supply. The first member includes a first lateral wall portion that is part of a lateral wall of the tubular shape and covers part of a peripheral edge of a circuit board accommodated inside the tubular shape; and a first divided connecting portion that is continuous with the first lateral wall portion and is part of the first connecting portion. The second member includes a base that is disposed closing the other opening of the tubular shape and on which a light source is placed; a second lateral wall portion that is adjacent to a side end of the first lateral wall portion and continuous from the base, is part of a lateral wall of the tubular shape, and covers part of the peripheral edge of the circuit board; and a second divided connecting portion that is continuous with the second lateral wall portion and is part of the first connecting portion.

A portable lighting appliance disclosed in the embodiment includes a first tubular body including a first member and a second member, having a tubular shape when the first member and the second member are combined, including a first connecting portion on one opening side of the tubular shape, and including a circuit board inside the tubular shape; and a second tubular body having a tubular shape, the second tubular body including a first holding portion that holds the first connecting portion of the first tubular body and accommodating a power supply. The first member includes a first lateral wall portion that is part of a lateral wall of the tubular shape and covers part of a peripheral edge of the circuit board accommodated inside the tubular shape; and a first divided connecting portion that is continuous with the first lateral wall portion and is part of the first connecting portion. The second member includes a base that is disposed closing the other opening of the tubular shape and on which a light source is placed; a second lateral wall portion that is adjacent to a side end of the first lateral wall portion and continuous from the base, is part of a lateral wall of the tubular shape, and covers part of the peripheral edge of the circuit board accommodated inside the tubular shape; and a second divided connecting portion that is continuous with the second lateral wall portion and is part of the first connecting portion.

According to the embodiments of the present disclosure, it is possible to provide a lighting appliance tubular body and a portable lighting appliance that can be miniaturized.

DESCRIPTION

Figure 1:
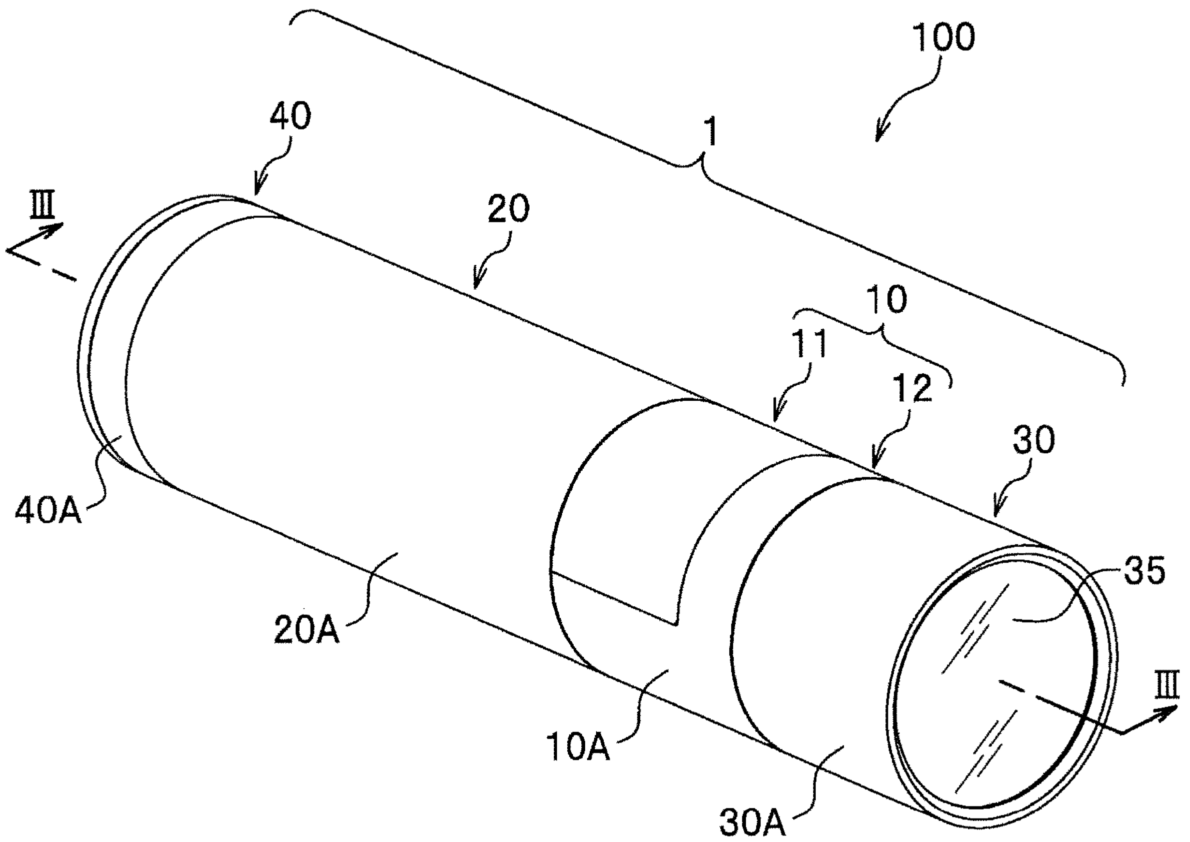
FIG. 1 is a perspective view schematically illustrating a portable lighting appliance according to an embodiment.

Hereinafter, embodiments according to the present disclosure will be described with reference to the drawings. However, the embodiments described below are intended to embody the technical idea according to the present disclosure, and the invention is not limited to the following unless otherwise specified. The contents described in one embodiment can also be applied to other embodiments and modifications. In addition, the drawings schematically illustrate the embodiments, and in order to clarify the description, a scale, an interval, a positional relationship, and the like of members may be exaggerated, or illustration of some of the members may be omitted. The directions illustrated in the drawings indicate relative positions between components, and are not intended to indicate absolute positions. Also, members having the same terms and reference signs, as a rule, represent the same members or members of the same quality, and the detailed description thereof is omitted as appropriate. In the embodiments, "covering" is not limited to a case of direct contact, but also includes a case of indirectly covering, for example, via another member.

Portable Lighting Appliance

Figure 2:
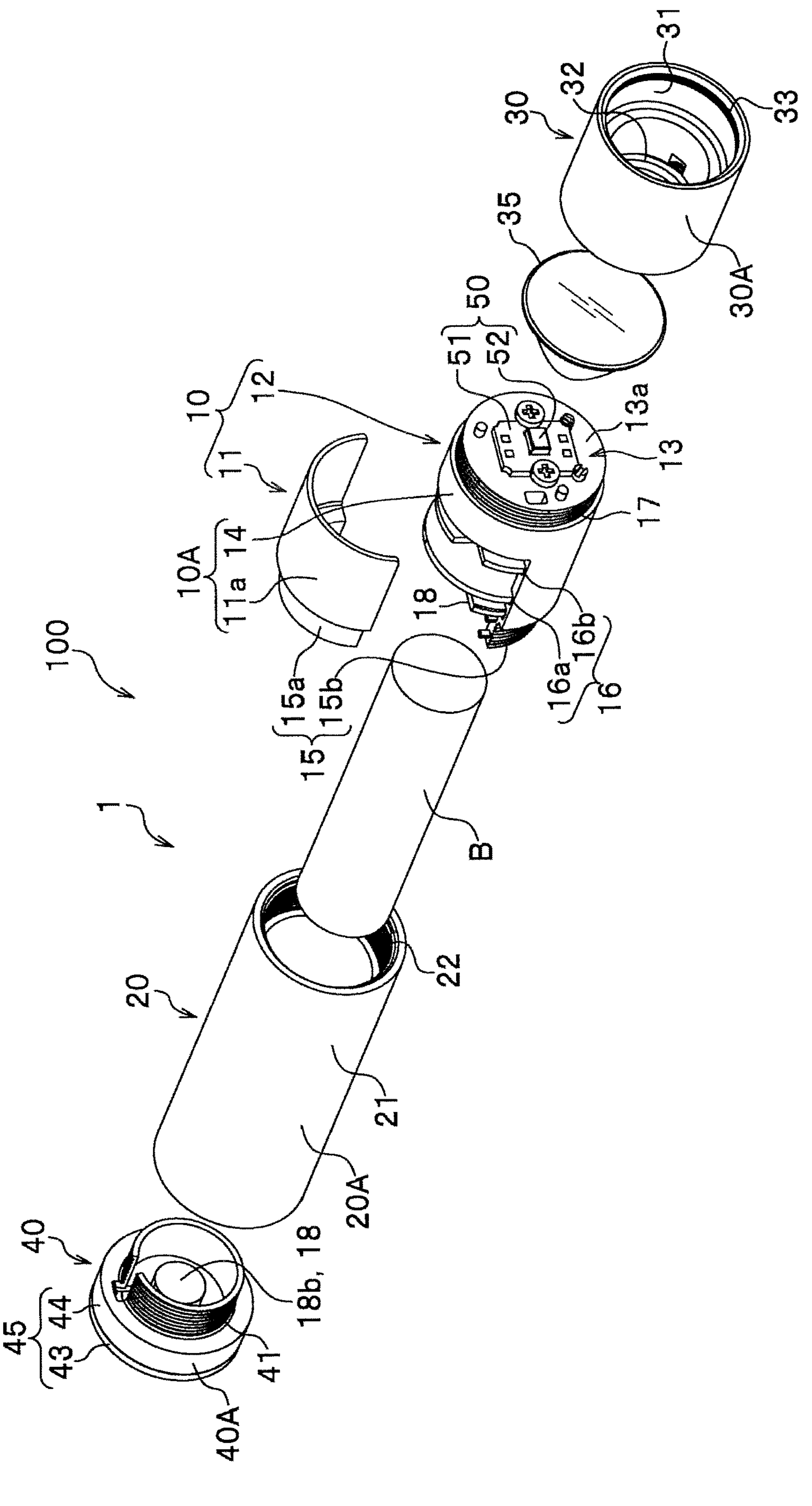
FIG. 2 is an exploded perspective view of the portable lighting appliance according to the embodiment.
Figure 3:
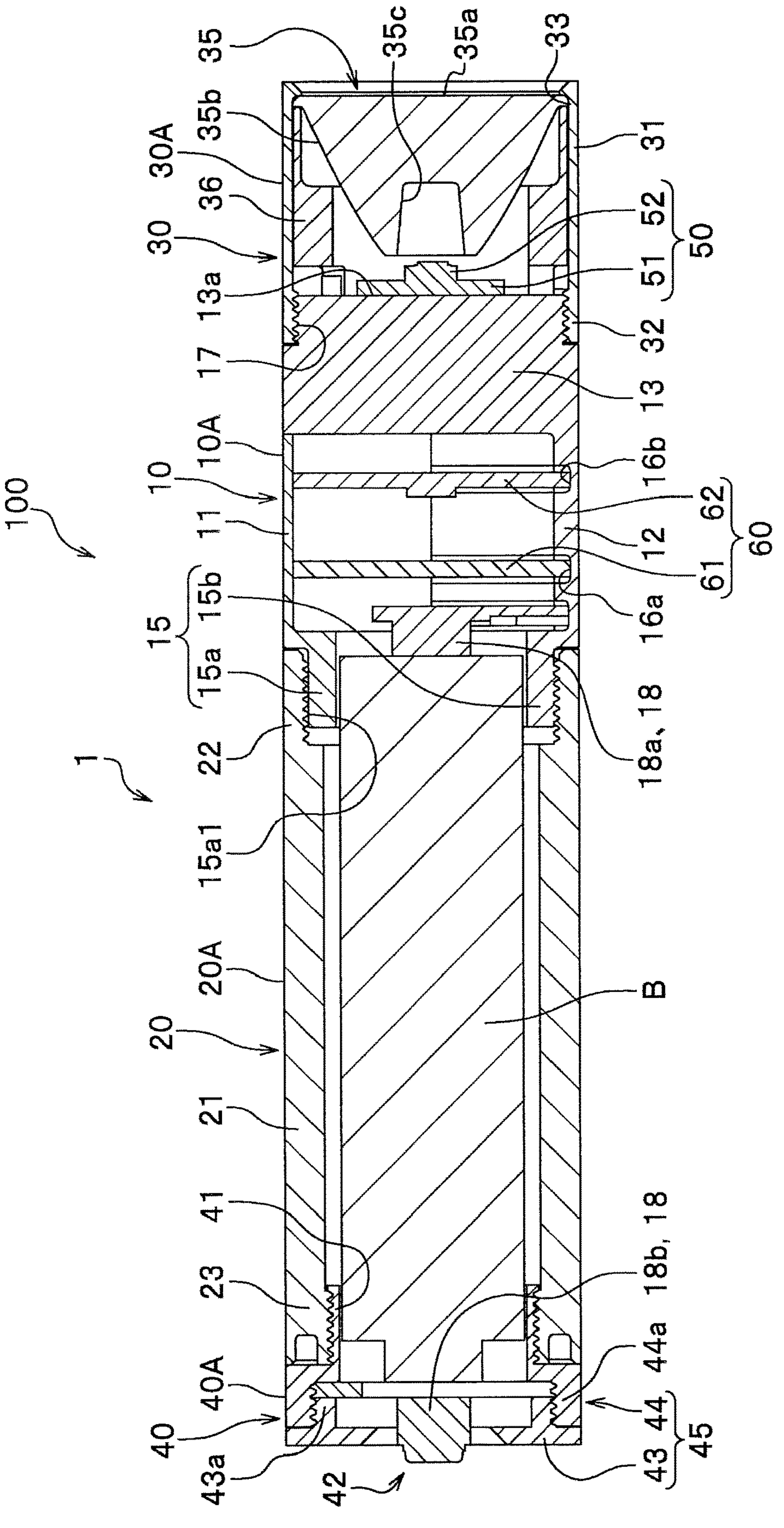
FIG. 3 is a cross-sectional view of the portable lighting appliance taken along line III-III in FIG. 1.
Figure 4:
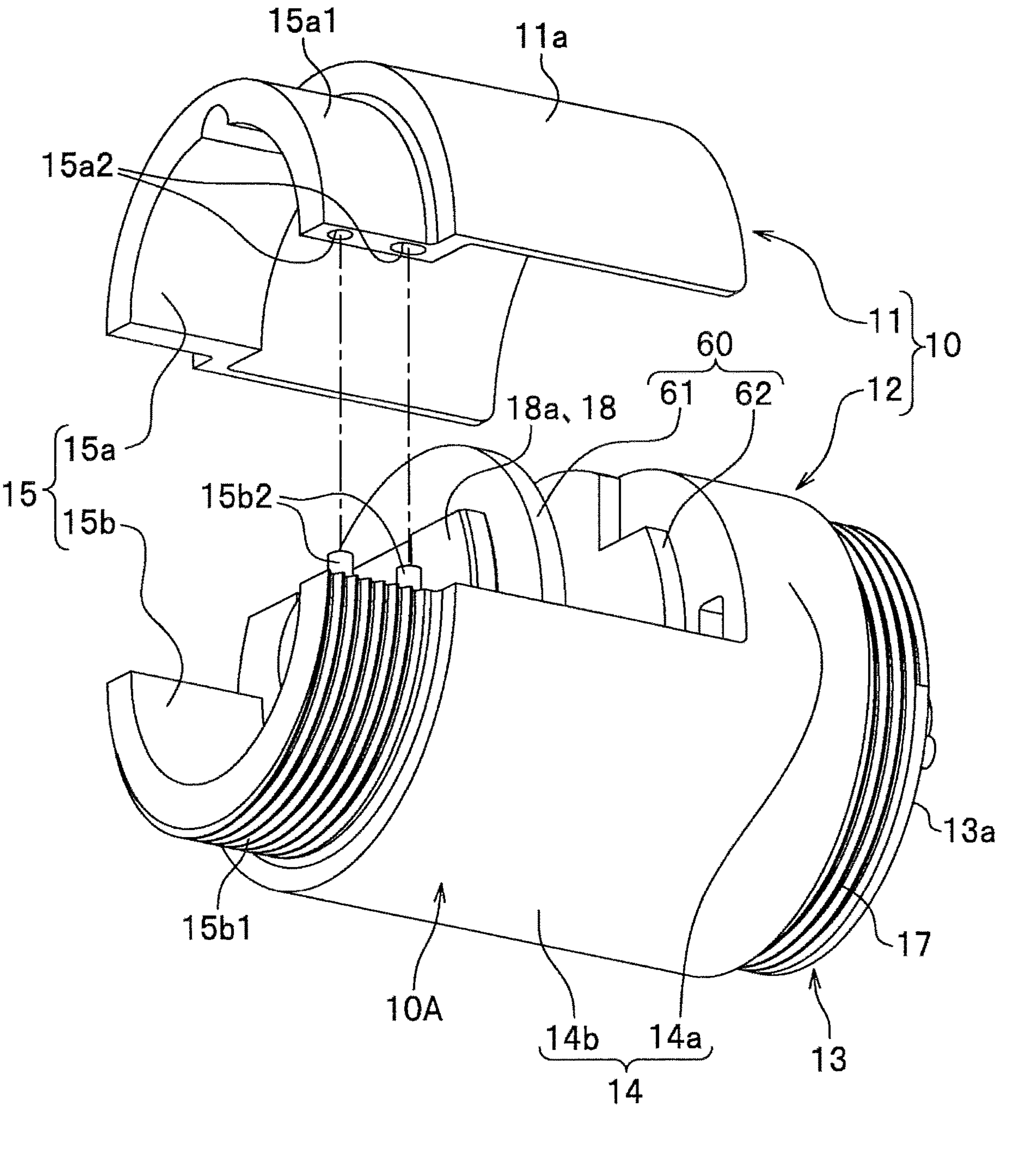
FIG. 4 is a perspective view illustrating a state in which a first tubular body of the portable lighting appliance according to the embodiment is divided.
Figure 5:
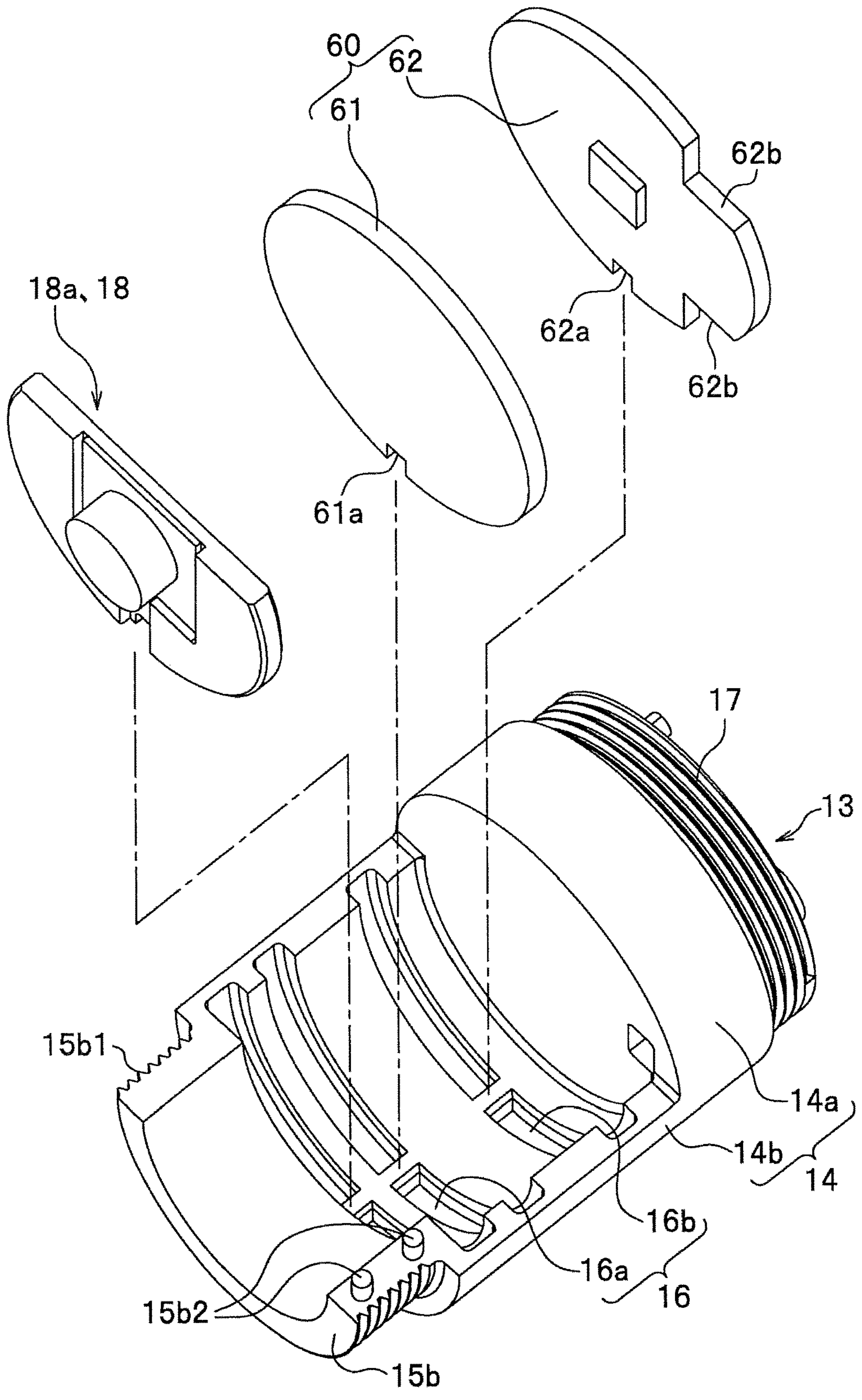
FIG. 5 is a perspective view illustrating a second member in the first tubular body of the portable lighting appliance of FIG. 4.

A portable lighting appliance 100 according to an embodiment will be described with reference to FIGS. 1 to 5. FIG. 1 is a perspective view schematically illustrating the portable lighting appliance according to the embodiment. FIG. 2 is an exploded perspective view of the portable lighting appliance according to the embodiment. FIG. 3 is a cross-sectional view of the portable lighting appliance taken along line III-III in FIG. 1. FIG. 4 is a perspective view illustrating a state in which a first tubular body of the portable lighting appliance according to the embodiment is divided. FIG. 5 is a perspective view illustrating a second member of the first tubular body of the portable lighting appliance illustrated in FIG. 4.

As illustrated in FIGS. 1 to 3, the portable lighting appliance 100 is configured such that a battery serving as a power supply B is accommodated in a lighting appliance tubular body 1 and a light source 50, a circuit board 60, and the like are disposed in the lighting appliance tubular body 1.

Here, for example, the lighting appliance tubular body 1 includes a first tubular body 10 that includes a first member 11 and a second member 12, has a tubular shape when the first member 11 and the second member 12 are combined with each other, and includes a first connecting portion 15 on one opening side of the tubular shape; and a second tubular body 20 having a tubular shape, the second tubular body 20 including a first holding portion 22 that holds the first connecting portion 15 of the first tubular body 10 and accommodating the power supply B.

Further, the first member 11 includes a first lateral wall portion 11*a* and a first divided connecting portion 15*a*, and the second member 12 includes a base 13, a second lateral wall portion 14, and a second divided connecting portion 15*b*.

Further, in the lighting appliance tubular body 1 and the portable lighting appliance 100, for example, the second tubular body 20 is detachably attached to one side of the first tubular body 10, and the third tubular body 30 is detachably attached to the other side of the first tubular body 10. In addition, the first tubular body 10 includes a third holding portion 17 that holds a third tubular body 30 having a tubular shape on the peripheral edge of the base 13. The third tubular body 30 includes an accommodating portion 31 having a tubular shape that accommodates a lens 35, and a third connecting portion 32 that is continuous with the accommodating portion 31 and is detachably connected to the third holding portion 17. Further, the second tubular body 20 will be described as having a lid portion 40 detachably attached to the opposite side of the first tubular body 10. Configurations of the lighting appliance tubular body 1 and the portable lighting appliance 100 will be described below.

As illustrated in FIGS. 3 and 4, the first tubular body 10 is a portion that supports the circuit board 60 in the tube and in which the light source 50 is disposed. One end side formed in the tubular shape of the first tubular body 10 is detachably connected to the second tubular body 20, and the third tubular body 30 is detachably connected to the other end side formed in the tubular shape. The first tubular body 10 includes the first member 11 and the second member 12. When the first member 11 and the second member 12 are combined with each other, the first tubular body 10 has a cylindrical outer shape and supports the circuit board 60 inside the tube. In addition, the second member 12 includes the base 13 on which the light source 50 is placed, such that one tube opening of the first tubular body 10 is closed, and protrudes in the direction of the other tube opening. In the protruding portion, a first electrode 18*a*, which is one of power supply electrodes 18 to be in contact with a battery serving as the power supply B, is disposed.

In the first tubular body 10, the first connecting portion 15 having a tubular shape is disposed on the outer side of the first electrode 18*a*. Further, the first tubular body 10 supports the circuit board 60 such that the circuit board 60 is accommodated inside the tubular shape. The first connecting portion 15 is attached to the first holding portion 22 so as to be located on the inner side of the first holding portion 22, the second divided connecting portion 15*b* includes part of a screw portion that engages with a screw structure of the first holding portion 22, and the first divided connecting portion 15*a* includes a contact surface 15*a*1 that comes into contact with a top portion of the screw structure of the first holding portion 22. The first tubular body 10 can be formed of a metal such as Al, Cu, or SUS (stainless steel), or an alloy metal, or can be formed of a resin having a self-extinguishing property and impact resistance, such as PC (polycarbonate).

The first member 11 together with the second member 12 constitutes the first tubular body 10. The first member 11 includes a first lateral wall portion 11*a* that is part of a lateral wall of the tubular shape and covers part of the peripheral edge of the circuit board 60 accommodated inside the tubular shape, and a first divided connecting portion 15*a* that is continuous with the first lateral wall portion 11*a* and is part of the first connecting portion 15.

The first lateral wall portion 11*a* is an arc-shaped surface and has a size such that an upper end of the first lateral wall portion 11*a* comes into contact with a lower end side of the base 13 of the second member 12 and both side ends of the first lateral wall portion 11*a* come into contact with the second lateral wall portion 14 of the second member 12. The arc-shaped surface refers to a surface having an arc-shaped cross section. The first lateral wall portion 11*a* is formed so as to be a semicircular arc surface. For example, the first lateral wall portion 11*a* is adjacent to an annular outer peripheral surface 14*a* on the lower end side of the base 13. In addition, the third tubular body 30 side may be described as an upper side, and the second tubular body 20 side may be described as a lower side.

The first divided connecting portion 15*a* is a portion to be part of the first connecting portion 15 of the first tubular body 10. The first divided connecting portion 15*a* is disposed continuously from the first lateral wall portion 11*a* via a step so as to have a semicircular arc shape having a diameter smaller than a diameter of the semicircular arc of the first lateral wall portion 11*a*.

In the first divided connecting portion 15*a*, the contact surface 15*a*1 and the back surface of the contact surface 15*a*1, which are the arc-shaped surfaces, are smooth curved surfaces. The contact surface 15*a*1 having an arc shape of the first divided connecting portion 15*a* is disposed at the same height as the root portion of the thread formed on the second divided connecting portion 15*b* of the second member 12. Therefore, when the first divided connecting portion 15*a* together with the second divided connecting portion 15*b* is screwed as the first connecting portion 15 into the screw portion of the first holding portion 22, the first divided connecting portion 15*a* slides in a state of being in contact with the top portion of the thread of the first holding portion 22. As will be described below, the first holding portion 22 can detachably hold the first connecting portion 15 that is screwed from the outside. Therefore, the contact surface 15*a*1 of the first divided connecting portion 15*a* comes into contact with the inner peripheral end surface which is the top portion of the thread of the screw structure of the first holding portion 22.

In addition, the first divided connecting portion 15*a* includes, in a plate thickness portion serving as a side end surface of the contact surface 15*a*1, engagement holes 15*a*2 with which engagement pins 15*b*2 disposed protruding from a plate thickness portion serving as a side end surface of the second divided connecting portion 15*b* are engaged. The engagement holes 15*a*2 are formed in shapes corresponding to the shapes of the engagement pins 15*b*2, and here, the engagement holes 15*a*2 are formed in circular shapes in a plan view, for example.

The second member 12 together with the first member 11 constitutes the first tubular body 10. The second member 12 includes the base 13 that is disposed adjacent to the first lateral wall portion 11*a*, closing the other opening of the tubular shape, and on which the light source 50 is placed, the second lateral wall portion 14 that is adjacent to the side ends of the first lateral wall portion 11*a* and continuous from the base 13 to form the lateral wall of the tubular shape and covers part of the peripheral edge of the circuit board 60, and the second divided connecting portion 15*b* that is continuous from the second lateral wall portion 14 and is part of the first connecting portion 15.

The base 13 is disposed closing one opening of the tubular shape of the first tubular body 10, and the light source 50 is placed on the base 13. The base 13 includes the third holding portion 17 that holds the third tubular body 30 having a tubular shape, on a peripheral edge of the base 13. The base 13 has a flat placement surface 13*a* on which the light source 50 is placed, and the placement surface 13*a* is formed in a circular shape in a plan view, for example. The light source 50 is placed on the placement surface 13*a* by attaching a mounting substrate 51 of a light-emitting device 52 to the placement surface 13*a* with screws or the like. The placement surface 13*a* includes a through hole penetrating the base 13 in the plate thickness direction, so that a wiring line can be electrically connected to the light source 50.

As illustrated in FIGS. 2 and 3, the light source 50 includes, for example, the mounting substrate 51 and the light-emitting device 52 disposed on the mounting substrate 51. The light source 50 preferably uses an LED (light-emitting diode) or an LD (laser diode) as the light-emitting device 52. In particular, when an LD is used in the light source 50, light emitted via the lens 35 can reach a farther place than when an LED is used. The irradiation light from the light source 50 is output via the lens 35, and thus, for example, can reach a place 1 km or more away from the light source 50.

Further, the base 13 includes the third holding portion 17 at a position one step lower than the placement surface 13*a*. The third holding portion 17 has, for example, a screw structure; it includes a portion in which a screw is formed over a predetermined width on the outer peripheral surface at a position one step lower than the placement surface 13*a*. A portion with the screw structure of the third connecting portion 32 of the third tubular body 30 is screwed to the third holding portion 17 from the outside. Therefore, the first tubular body 10 and the third tubular body 30 can be detachably attached and detached by the third holding portion 17 and the third connecting portion 32.

Here, the third tubular body 30 connected to the first tubular body 10 accommodates the lens 35 therein as described below.

As illustrated in FIG. 4, the second lateral wall portion 14 is continuous with the base 13 and constitutes an outer lateral wall 10A of the first tubular body 10 together with the first lateral wall portion 11*a*. The second lateral wall portion 14 includes an annular outer peripheral surface 14*a* with a predetermined width and an arc-shaped outer peripheral surface 14*b* with a predetermined width continuous with the annular outer peripheral surface 14*a*. As illustrated in FIG. 5, the arc-shaped outer peripheral surface 14*b* includes a board support portion 16 that supports the circuit board 60, and the board support portion 16 includes a first support portion 16*a* disposed along the circumferential direction of the inner peripheral surface of the second lateral wall portion 14, and a second support portion 16*b* spaced apart from the first support portion 16*a* in an axial direction of the tubular shape such that the circuit board 60 can be supported.

The annular outer peripheral surface 14*a* is adjacent to the upper end of the first lateral wall portion 11*a* of the first member 11, and the arc-shaped outer peripheral surface 14*b* is disposed adjacent to the side ends of the first lateral wall portion 11*a* of the first member. The arc-shaped outer peripheral surface 14*b* is disposed having an arc length of a semicircular arc. This arc-shaped outer peripheral surface 14*b* and the first lateral wall portion 11*a* of the first member are combined to form a cylindrical shape, and the board support portion 16 is provided on the inner peripheral surface side of the arc-shaped outer peripheral surface 14*b*, whereby the circuit board 60 is accommodated and supported inside the tubular shape.

As an example, the board support portion 16 detachably supports the circuit board 60 by detachably fitting the circuit board 60 into the inner peripheral surface of the second lateral wall portion 14. Here, the board support portion 16 includes the first support portion 16*a* and the second support portion 16*b* that support the circuit board 60 when part of the peripheral edge of the circuit board 60 is fitted into the grooves. In the circuit board 60, a first board 61 is supported by the first support portion 16*a*, and a second board 62 is supported by the second support portion 16*b*. Note that the board support portion 16 does not need to be provided on the first lateral wall portion 11*a* as long as the board support portion 16 is provided on the second lateral wall portion 14. Thus, the structure of the first lateral wall portion 11*a* can be simplified.

The first support portion 16*a* has a groove portion in which a peripheral edge portion in a predetermined range in the circumferential direction of the first board 61 is fitted and supported, in the inner peripheral surface of the second lateral wall portion 14. The second support portion 16*b* has a groove portion in the inner peripheral surface of the second lateral wall portion 14 such that the second board 62 is supported at a position spaced apart from the first board 61 supported by the first support portion 16*a*. The first support portion 16*a* and the second support portion 16*b* each have a recessed groove portion in the thickness-wise direction along the second lateral wall portion 14 having the arc shape. Projecting portions can be provided in the groove portions of the second lateral wall portion 14 so as to be engaged with recessed portions 61*a* and 62*a* respectively provided in the first board 61 and the second board 62.

The first board 61 supported by the first support portion 16*a* is, for example, a board provided with a booster circuit. The second board 62 supported by the second support portion 16*b* is, for example, a board provided with a driver circuit of the light-emitting device 52. The second board 62 is formed including in advance an opening portion 62*b* formed by cutting out part of the disk shape such that the opening portion 62*b* has a fan shape. The opening portion of the second board can be used to improve the circulation of air in the tube and to dispose a wiring line, for example. In addition, the first support portion 16*a* and the second support portion 16*b* can be in contact with the electrode of the circuit board 60 inside the grooves, thereby allowing electrical connection with the power supply B.

The second divided connecting portion 15*b* constitutes the first connecting portion 15 together with the first divided connecting portion 15*a* of the first member 11. The second divided connecting portion 15*b* is disposed continuously from the second lateral wall portion 14 via a step so as to have a semicircular arc shape having a diameter smaller than a diameter of the semicircular arc of the second lateral wall portion 14.

The second divided connecting portion 15*b* includes a screw portion 15*b*1 in an arc-shaped portion thereof. Therefore, when the second divided connecting portion 15*b* together with the first divided connecting portion 15*a* is screwed as the first connecting portion 15 into the screw portion of the first holding portion 22, the second divided connecting portion 15*b* is screwed into the screw portion of the first holding portion 22. As will be described below, the first holding portion 22 can detachably hold the first connecting portion 15 when the first connecting portion 15 is screwed into the first holding portion 22 from the outside. Therefore, the screw portion 15*b*1 of the second divided connecting portion 15*b* is engaged with the screw portion of the first holding portion 22.

In addition, the second divided connecting portion 15*b* includes, on the plate thickness portion serving as the side end surface of the screw portion 15*b*1, the engagement pins 15*b*2 disposed protruding from the thickness portion so that the engagement pins 15*b*2 are fitted into the engagement holes 15*a*2 provided in the side end surface of the first divided connecting portion 15*a*. The engagement pins 15*b*2 are formed in shapes corresponding to the shapes of the engagement holes 15*a*2, and are formed in columnar shapes here, for example.

Alternatively, the engagement pin 15*b*2 can be provided as a member separate from the second divided connecting portion 15*b*, and the second divided connecting portion 15*b* can include an engagement hole with which the engagement pin 15*b*2 engages, in a plate thickness portion serving as a side end surface of the screw portion 15*b*1.

In the second member 12, the first electrode 18*a* serving as one of the power supply electrodes 18 is disposed in contact with one electrode of a battery serving as the power supply B in a direction in which the opening of the tubular shape is closed, on the inner side of the second divided connecting portion 15*b*.

The first electrode 18*a* is disposed in a plate shape substantially parallel to the first board 61 in the tube so as to be spaced apart from the first board 61 supported by the first support portion 16*a*. The first electrode 18*a* is formed in a semicircular shape or a major arc shape, and is disposed including a metallic electrode at the center of the tubular shape. For example, the first electrode 18*a* is disposed detachably fitted into the recessed groove provided on the inner peripheral surface side of the second member 12. In the first electrodes 18*a*, a circular metal piece with which the electrode of the power supply B comes into contact is disposed at a predetermined position of an insulating resinous substrate.

As illustrated in FIGS. 2 and 3, the second tubular body 20 includes the first holding portion 22 that holds the first tubular body 10, on one opening side of a tubular main body 21, and the second holding portion 23 that holds the lid portion 40, on the other opening side of the tubular main body 21, and accommodates a battery as the power supply B inside the tubular main body 21.

For example, the second tubular body 20 is formed in a cylindrical shape, and serves as a portion of the portable lighting appliance 100 to be held by a user together with the first tubular body 10.

The second tubular body 20 can be formed of, for example, a metal such as aluminum (Al) or copper Cu, an alloy thereof, or a metal such as stainless steel (SUS).

Further, the first connecting portion 15 of the first tubular body 10 has a diameter smaller than a diameter of the tubular portion (outer lateral wall 10A) of the first tubular body 10, the first holding portion 22 of the second tubular body 20 is located on the outer side of the first connecting portion 15, and the tubular portion (outer lateral wall 20A) of the second tubular body 20 has substantially the same diameter as the diameter of the tubular portion (outer lateral wall 10A) of the first tubular body 10.

The first holding portion 22 detachably holds the first connecting portion 15 of the first tubular body 10, and has a screw structure as an example. The diameter of the first holding portion 22 is larger than the diameter of the first connecting portion 15, and the first holding portion 22 holds the first connecting portion 15 such that it is accommodated inside the tube. The screw structure of the second divided connecting portion 15*b* of the first connecting portion 15 is screwed into the first holding portion 22 and the contact surface 15*a*1 of the first divided connecting portion 15*a* of the first connecting portion 15 comes into contact with the top portion of the thread of the first holding portion 22, whereby the first holding portion 22 holds the first connecting portion 15.

The second holding portion 23 detachably holds the second connecting portion 41 of the lid portion 40. The second holding portion 23 has, for example, a screw structure that can correspond to the screw structure of the second connecting portion 41. The second holding portion 23 holds the second connecting portion 41 such that it is accommodated inside the tube. The second holding portion 23 detachably holds the second connecting portion 41 when the screw structure of the second connecting portion 41 is screwed into the second holding portion 23.

The third tubular body 30 is disposed connected to the first tubular body 10. The third tubular body 30 is disposed to accommodate the lens 35 therein and send light from the light source 50 to a distant place.

The outer lateral wall 30A of the third tubular body 30 is disposed so as to be substantially flush with the outer lateral wall 10A of the first tubular body 10 and the outer lateral wall 20A of the second tubular body 20.

The accommodating portion 31 includes a space for accommodating the lens 35 inside the tubular body formed in the cylindrical shape as an example. The accommodating portion 31 includes an uneven portion on the inner peripheral surface of the tube in accordance with the shape of the lens 35 so that the lens 35 does not move when the lens 35 is accommodated, and has a fixing groove 33 for fixing the peripheral edge of the tip surface of the lens 35, on the inner peripheral surface of the tube. The accommodating portion 31 is configured such that heat from the light source 50 is released. For example, an annular member 36 is disposed in the accommodating portion 31 in order to improve heat dissipation. In the annular member 36, the thickness on the nine-section side close to the light source 50 is increased to increase the surface area, thereby enhancing the heat dissipation.

As the lens 35, for example, a collimating lens that collimates light from the light source 50 is used. The lens 35 includes a flat irradiation surface 35*a* for emitting light at one end, an inclined surface 35*b* having a radius decreasing toward the other end opposite to the irradiation surface 35*a*, and a recessed portion 35*c* at the other end. The recessed portion 35*c* is disposed facing the light-emitting device 52 of the light source 50 such that light from the light-emitting device 52 enters the recessed portion 35*c*. Although the lens 35 is disposed such that the irradiation surface 35*a* for emitting light is directly exposed to the outside, a light-transmissive protective cover can be disposed in the fixing groove 33. When a disc-shaped protective cover is disposed, the fixing grooves 33 are disposed at two positions at an interval in the axial direction of the tubular shape; thus, the peripheral edge of the lens 35 is fixed in one of the fixing grooves 33, and the protective cover is fixed in the other fixing groove 33.

The lid portion 40 is detachably held by the second holding portion 23 of the second tubular body 20. The lid portion 40 includes the second connecting portion 41 that is detachably connected to the second holding portion 23, and a second electrode 18*b* that is in contact with the other electrode of the battery as the power supply B and serves as the other of the power supply electrodes 18. The lid portion 40 is formed having a size and a shape such that the outer lateral wall 40A of the lid portion 40 and the outer lateral wall 20A of the second tubular body 20 are flush with each other when the lid portion 40 is attached to the second tubular body 20. The lid portion 40 is, for example, a member that includes the second electrode 18*b* in contact with the other electrode of the power supply B and closes the opening on the other end side of the second tubular body 20. The lid portion 40 includes the second connecting portion 41 and a power switch 42. Here, the lid portion 40 includes a lid tubular body 45 including a first lid member 43 and a second lid member 44.

The second connecting portion 41 is detachably held by the second holding portion 23 of the second tubular body 20 via the screw structure. The screw structure of the second connecting portion 41 is disposed on the inner side of the second holding portion 23. The second connecting portion 41 is disposed on the second lid member 44.

The first lid member 43 is a disc-shaped member, and the power switch 42 is disposed at the center thereof. The first lid member 43 includes, on the peripheral edge side thereof, a first screw portion 43*a* detachable from the second screw portion 44*a* of the second lid member 44.

The lid tubular body 45 is detachable by screwing the first screw portion 43*a* of the first lid member 43 into the second screw portion 44*a* of the second lid member 44, and has a configuration facilitating the attachment work of the power switch 42 disposed inside the lid tubular body 45. The power switch 42 is a general switch that operates such that the second electrode 18*b* is pushed out and brought into contact with the power supply B to turn on the power supply when the power switch 42 is pressed, and the second electrode 18*b* is separated from the power supply B to turn off the power supply when the power switch 42 is pressed again.

As described above, the lighting appliance tubular body 1 and the portable lighting appliance 100 have the following operations and effects by including the members.

In the portable lighting appliance 100 and the lighting appliance tubular body 1, the first tubular body 10 is divided into the first member 11 and the second member 12, and a tubular shape is formed by combining the first member 11 and the second member 12, whereby the circuit board 60 having a size corresponding to the diameter of the tubular body can be incorporated. Therefore, it is not necessary to increase the size of one opening of the tubular body and accommodate the circuit board 60 from the opening, which eliminates the need to increase the size of the outer shape of the portable lighting appliance 100. That is, for the portable lighting appliance 100 and the lighting appliance tubular body 1, it is possible to reduce the overall size and achieve miniaturization. In addition, even in a case in which a plurality of boards such as the first board 61 and the second board 62 are used, since the first board 61 and the second board 62 can be supported by the board support portion 16 of the second member with a certain distance therebetween, it is possible to appropriately dissipate heat generated from the boards.

Further, the portable lighting appliance 100 can output light from the light source 50 via the lens 35 such that the light can reach, for example, a place 1 km or more away from the light source 50. That is, even if the external size of the portable lighting appliance 100 is small, by using the light-emitting device 52 such as an LD and providing the first board 61 provided with a booster circuit and the second board 62 provided with a driver circuit, it is possible to increase the output and make emitted light reach a distant place.

The lighting appliance tubular body 1 and the portable lighting appliance 100 have been described as having a cylindrical outer shape, but the outer shape is not limited to a cylindrical shape, and can be a rectangular tubular shape, a regular polygonal tubular shape, an elliptical cylindrical shape, or the like. Further, in the lighting appliance tubular body 1 and the portable lighting appliance 100, the first lateral wall portion 11*a* of the first member and the second lateral wall portion 14 of the second member have been described as having a semicircular arc shape in cross section, but one of them can have a minor arc shape and the other can have a major arc shape. Further, as long as the first lateral wall portion 11*a* and the second lateral wall portion 14 are combined to form a cylindrical shape (tubular shape), the first lateral wall portion 11*a* and the second lateral wall portion 14 can have bilaterally symmetrical shapes or bilaterally asymmetrical shapes.

In addition, the first divided connecting portion 15*a* includes the contact surface 15*a*1 that does not have a screw structure in a portion that is screwed into the first holding portion 22, but can have a screw structure. That is, the first connecting portion 15 can have a screw structure, and the first holding portion 22 can have a screw structure that detachably holds the first connecting portion 15. When the screw structure is provided, it is necessary to adjust the positions of the screw structure of the screw portion 15*b*1 of the second divided connecting portion 15*b* and the screw structure on the first divided connecting portion 15*a* side. When the first divided connecting portion 15*a* includes the contact surface 15*a*1 having no screw structure, the position adjustment of the screw structure is unnecessary. In the above description, the contact surface 15*a*1 is in contact with the top portion of the screw structure of the first holding portion 22; however, the contact is not essential, and a gap can be provided therebetween.

Further, for the sizes of the outer shapes of the first tubular body 10 and the second tubular body 20, for example, the first connecting portion 15 of the first tubular body 10 has a diameter smaller than a diameter of the tubular portion (outer lateral wall 10A) of the first tubular body 10, the first holding portion 22 of the second tubular body 20 is located on the outer side of the first connecting portion 15, and the tubular portion (outer lateral wall 20A) of the second tubular body 20 has a diameter smaller than the diameter of the tubular portion (outer lateral wall 10A) of the first tubular body 10. In this case, the lid portion 40 attached to the second tubular body 20 can have substantially the same diameter as the diameter of the tubular portion (outer lateral wall 20A) of the second tubular body 20, or can have substantially the same diameter as the diameter of the tubular portion (outer lateral wall 10A) of the first tubular body 10.

In the above description, the terms "substantially the same diameter", "substantially flush", and "substantially the same size" mean that one has a margin of error of ±3% with respect to the other. The expression "substantially the same diameter in the case of a non-circular shape" means that, for example, in the case of a quadrangular shape, a regular polygonal shape, or an elliptical shape, the outer shape is the same and the size of one shape has a margin of error of ±3% with respect to the size of the other shape. The first tubular body 10 can have a circular shape or a regular polygonal shape in a cross-sectional view in a direction orthogonal to an axis of the tubular shape, and the second tubular body 20 can have a circular shape or a regular polygonal shape in a cross-sectional view in a direction orthogonal to an axis of the tubular shape and have a size such that a battery can be accommodated inside the tubular shape. The outer shapes of the first tubular body 10, the second tubular body 20, the third tubular body 30, and the lid portion 40 can be different from each other.

Although the second member 12 includes the board support portion 16 for the circuit board 60 in the above description, the board support portion 16 can also be disposed in the first member 11.

Furthermore, the battery used as the power supply B can be a dry battery, a rechargeable battery, a button battery, or the like, as long as it has a size small enough for portable use. When a button battery is used, the length of the tubular main body 21 of the second tubular body 20 can be made equal to or shorter than when a dry battery is used. When a button battery is used, using a plurality of button batteries connected in series is preferable to using one button battery.

In addition, members which can be attached and detached by screw structures can be fixed so as to be non-detachable at a stage in which the portable lighting appliance 100 is completed.

In the claims of the present invention, the following relationships of dependent claims may be satisfied.

Aspect 1

A lighting appliance tubular body including:
- a first tubular body including a first member and a second member, the first tubular body having a first tubular shape when the first member and the second member are combined, and the first tubular body including a first connecting portion on one opening side of the first tubular shape; and
- a second tubular body having a second tubular shape, the second tubular body including a first holding portion that holds the first connecting portion of the first tubular body, the second tubular body being configured to accommodate a power supply, wherein
- the first member includes:
  - a first lateral wall portion that is part of a lateral wall of the tubular shape, the first lateral wall portion is configured to cover part of a peripheral edge of a circuit board when the circuit board is accommodated inside the first tubular shape; and
  - a first divided connecting portion that is continuous with the first lateral wall portion and is part of the first connecting portion, and
- the second member includes:
  - a base that is disposed closing the other opening of the tubular shape and on which a light source is placed;
  - a second lateral wall portion that is adjacent to a side end of the first lateral wall portion and continuous from the base, the second lateral wall portion is part of the lateral wall of the first tubular shape, and the second lateral wall portion is configured to cover part of the peripheral edge of the circuit board when the circuit board is accommodated inside the first tubular shape; and
  - a second divided connecting portion that is continuous with the second lateral wall portion, the second divided connecting portion is part of the first connecting portion.

Aspect 2

The lighting appliance tubular body according to aspect 1, wherein
- the first tubular body includes, on a peripheral edge of the base, a third holding portion that holds a third tubular body having a third tubular shape, and
- the third tubular body includes an accommodating portion that accommodates a lens, and a third connecting portion that is continuous with the accommodating portion and is detachably connected to the third holding portion.

Aspect 3

The lighting appliance tubular body according to aspect 1 or 2, wherein
- the first connecting portion is attached to the first holding portion such that the first connecting portion is located on an inner side of the first holding portion, the second divided connecting portion includes part of a screw portion that engages with a screw structure of the first holding portion, and the first divided connecting portion includes a contact surface that comes into contact with an inner peripheral end surface of the screw structure of the first holding portion.

Aspect 4

The lighting appliance tubular body according to any one of aspects 1 to 3, wherein the first connecting portion includes a screw structure, and the first holding portion includes a screw structure that detachably holds the first connecting portion.

Aspect 5

The lighting appliance tubular body according to any one of aspects 1 to 4, wherein
- the first connecting portion of the first tubular body has a diameter smaller than a diameter of a tubular portion of the first tubular body, the first holding portion of the second tubular body is located on an outer side of the first connecting portion, and a tubular portion of the second tubular body has substantially the same diameter as the diameter of the tubular portion of the first tubular body.

Aspect 6

The lighting appliance tubular body according to any one of aspects 1 to 5, wherein
- the first connecting portion of the first tubular body has a diameter smaller than a diameter of a tubular portion of the first tubular body, the first holding portion of the second tubular body is located on an outer side of the first connecting portion, and a tubular portion of the second tubular body has a diameter smaller than the diameter of the tubular portion of the first tubular body.

Aspect 7

The lighting appliance tubular body according to any one of aspects 1 to 6, wherein
- the second lateral wall portion includes a board support portion that is configured to support the circuit board when the circuit board is accommodated inside the first tubular shape, and the board support portion includes:
  - a first support portion disposed along an inner peripheral surface of the second lateral wall portion, and a second support portion spaced apart from the first support portion in an axial direction of the first tubular shape such that the circuit board can be supported when the circuit board is accommodated inside the first tubular shape.

Aspect 8

The lighting appliance tubular body according to any one of aspects 1 to 7, wherein the second member includes a first electrode that comes into contact with one electrode of a battery serving as a power supply in a direction in which an opening of the first tubular shape is closed on an inner side of the first connecting portion, the first electrode serving as one of power supply electrodes, and the second tubular body includes a lid portion detachably attached to an opening of the second tubular shape on a side opposite to the first holding portion via a second holding portion, and the lid portion includes:

a second connecting portion that is detachably connected to the second holding portion, and a second electrode that comes into contact with the other electrode of the battery and serves as the other of the power supply electrodes.

Aspect 9

The lighting appliance tubular body according to any one of aspects 1 to 8, wherein the first tubular body has a circular shape or a regular polygonal shape in a cross-sectional view in a direction orthogonal to an axis of the first tubular shape, and the second tubular body has a circular shape or a regular polygonal shape in a cross-sectional view in a direction orthogonal to an axis of the second tubular shape, the second tubular body having a size such that a battery can be accommodated inside the second tubular shape.

Aspect 10

A portable lighting appliance including:

a first tubular body including a first member and a second member, the first tubular body having a first tubular shape when the first member and the second member are combined, the first tubular body including a first connecting portion on one opening side of the first tubular shape, and the first tubular body including a circuit board inside the first tubular shape; and a second tubular body having a second tubular shape, the second tubular body including a first holding portion that holds the first connecting portion of the first tubular body, the second tubular body accommodating a power supply, wherein the first member includes:

a first lateral wall portion that is part of a lateral wall of the first tubular shape and covers part of a peripheral edge of the circuit board accommodated inside the first tubular shape; and a first divided connecting portion that is continuous with the first lateral wall portion and is part of the first connecting portion, and the second member includes:

a base that is disposed closing the other opening of the tubular shape and on which a light source is placed;

a second lateral wall portion that is adjacent to a side end of the first lateral wall portion and continuous from the base, the second lateral wall portion is part of the lateral wall of the first tubular shape, and the second lateral wall portion covers part of the peripheral edge of the circuit board accommodated inside the first tubular shape; and a second divided connecting portion that is continuous with the second lateral wall portion, the second divided connecting part is part of the first connecting portion.

Aspect 11

The portable lighting appliance according to aspect 10, wherein the first connecting portion is attached to the first holding portion such that the first connecting portion is located on an inner side of the first holding portion, the second divided connecting portion includes part of a screw portion that engages with a screw structure of the first holding portion, and the first divided connecting portion has a contact surface that comes into contact with an inner peripheral end surface of the screw structure of the first holding portion.

Aspect 12

The portable lighting appliance according to aspect 10 or 11, wherein the first tubular body includes, on a peripheral edge of the base, a third holding portion that holds a third tubular body having a third tubular shape, and the third tubular body includes an accommodating portion and a third connecting portion that is continuous with the accommodating portion and is connected to the third holding portion, the accommodating portion accommodating a collimating lens that collimates light from the light source.

Aspect 13

The portable lighting appliance according to any one of aspects 10 to 12, wherein the second member includes a first electrode that comes into contact with one electrode of a battery serving as the power supply in a direction in which an opening of the first tubular shape is closed on an inner side of the first connecting portion, the first electrode serving as one of power supply electrodes, and the second tubular body includes a lid portion detachably attached to an opening of the second tubular shape on a side opposite to the first holding portion via a second holding portion, and the lid portion includes:

a second connecting portion that is detachably connected to the second holding portion, and a second electrode that comes into contact with the other electrode of the battery, the second electrode serving as the other of the power supply electrodes.

Aspect 14

The portable lighting appliance according to any one of aspects 10 to 13, wherein the second lateral wall portion includes a board support portion that supports the circuit board, and the board support portion includes:

a first support portion disposed along an inner peripheral surface of the second lateral wall portion, and a second support portion spaced apart from the first support portion in an axial direction of the first tubular shape such that the circuit board can be supported, and the circuit board includes:

a first board supported by the first support portion, and a second board supported by the second support portion at a position spaced apart from the first board.

Aspect 15

The portable lighting appliance according to any one of aspects 10 to 14, wherein the light source includes a laser diode.

REFERENCE SIGNS LIST

1 Lighting appliance tubular body
10 First tubular body
10A Outer lateral wall of first tubular body
11 First member
11*a* First lateral wall portion
15*a* First divided connecting portion
12 Second member
13 Base
13*a* Placement surface
14 Second lateral wall portion
14*a* Annular outer peripheral surface
14*b* Arc-shaped outer peripheral surface
15 First connecting portion
15*a* First divided connecting portion
15*a*1 Contact surface
15*a*2 Engagement hole
15*b* Second divided connecting portion
16 Board support portion
16*a* First support portion
16*b* Second support portion
17 Third holding portion
18 Power supply electrode
18*a* First electrode
18*b* Second electrode
20 Second tubular body
20A Outer lateral wall of second tubular body
21 Tubular main body
22 First holding portion
23 Second holding portion
30 Third tubular body
30A Outer lateral wall of third tubular body
31 Accommodating portion
32 Third connecting portion
33 Fixing groove
35 Lens (collimating lens)
40 Lid portion
40A Outer lateral wall of lid portion
41 Second connecting portion
42 Power switch
43 First lid member
44 Second lid member
45 Lid tubular body
50 Light source
51 Mounting substrate
52 Light-emitting device (LD)
60 Circuit board
100 Portable lighting appliance
B Power supply (battery)

What is claimed is:

1. A lighting appliance tubular body, comprising:

a first tubular body including a first member and a second member, the first tubular body having a first tubular shape when the first member and the second member are combined, the first tubular body including a first connecting portion on one opening side of the first tubular body; and a second tubular body separate from the first tubular body and having a second tubular shape, the second tubular body including a first holding portion that holds the first connecting portion of the first tubular body, the second tubular body being configured to accommodate a power supply, wherein the first member includes:

a first lateral wall portion that is part of a lateral wall of the first tubular body, the first lateral wall portion is configured to cover part of a peripheral edge of a circuit board when the circuit board is accommodated inside the first tubular body; and a first divided connecting portion that is continuous with the first lateral wall portion and is part of the first connecting portion, and the second member includes:

a base that is disposed closing an other opening side of the first tubular body and on which a light source is placed;

a second lateral wall portion that is adjacent to a side end of the first lateral wall portion and continuous from the base, the second lateral wall portion is part of the lateral wall of the first tubular body, and the second lateral wall portion is configured to cover part of the peripheral edge of the circuit board when the circuit board is accommodated inside the first tubular body; and a second divided connecting portion that is continuous with the second lateral wall portion, the second divided connecting portion is part of the first connecting portion.

2. The lighting appliance tubular body according to claim 1, wherein the first tubular body includes, on a peripheral edge of the base, a third holding portion that holds a third tubular body having a third tubular shape, and the third tubular body includes an accommodating portion that accommodates a lens, and a third connecting portion that is continuous with the accommodating portion and is detachably connected to the third holding portion.

3. The lighting appliance tubular body according to claim 1, wherein the first connecting portion is attached to the first holding portion such that the first connecting portion is located on an inner side of the first holding portion, the second divided connecting portion includes part of a screw portion that engages with a screw structure of the first holding portion, and the first divided connecting portion includes a contact surface that comes into contact with an inner peripheral end surface of the screw structure of the first holding portion.

4. The lighting appliance tubular body according to claim 1, wherein the first connecting portion includes a screw structure, and the first holding portion includes a screw structure that detachably holds the first connecting portion.

5. The lighting appliance tubular body according to claim 1, wherein the first connecting portion of the first tubular body has a diameter smaller than a diameter of a tubular portion of the first tubular body, the first holding portion of the second tubular body is located on an outer side of the first connecting portion, and a tubular portion of the second tubular body has substantially the same diameter as the diameter of the tubular portion of the first tubular body.

6. The lighting appliance tubular body according to claim 1, wherein the first connecting portion of the first tubular body has a diameter smaller than a diameter of a tubular portion of the first tubular body, the first holding portion of the second tubular body is located on an outer side of the first connecting portion, and a tubular portion of the second tubular body has a diameter smaller than the diameter of the tubular portion of the first tubular body.

7. The lighting appliance tubular body according to claim 1, wherein the second lateral wall portion includes a board support portion that is configured to support the circuit board when the circuit board is accommodated inside the first tubular body, and the board support portion includes:

a first support portion disposed along an inner peripheral surface of the second lateral wall portion, and a second support portion spaced apart from the first support portion in an axial direction of the first tubular body such that the circuit board can be supported when the circuit board is accommodated inside the first tubular body.

8. The lighting appliance tubular body according to claim 1, wherein the second member includes a first electrode that comes into contact with one electrode of a battery serving as a power supply in a direction in which an opening of the first tubular body is closed on an inner side of the first connecting portion, the first electrode serving as one of power supply electrodes, and the second tubular body includes a lid portion detachably attached to an opening of the second tubular body on a side opposite to the first holding portion via a second holding portion, and the lid portion includes:

a second connecting portion that is detachably connected to the second holding portion, and a second electrode that comes into contact with the other electrode of the battery and serves as the other of the power supply electrodes.

9. The lighting appliance tubular body according to claim 1, wherein the first tubular body has a circular shape or a regular polygonal shape in a cross-sectional view in a direction orthogonal to an axis of the first tubular body, and the second tubular body has a circular shape or a regular polygonal shape in a cross-sectional view in a direction orthogonal to an axis of the second tubular body, the second tubular body having a size such that a battery can be accommodated inside the second tubular body.

10. A portable lighting appliance comprising:

a first tubular body including a first member and a second member, the first tubular body having a first tubular shape when the first member and the second member are combined, the first tubular body including a first connecting portion on one opening side of the first tubular body, the first tubular body including a circuit board inside the first tubular body; and a second tubular body separate from the first tubular body and having a second tubular shape, the second tubular body including a first holding portion that holds the first connecting portion of the first tubular body, the second tubular body accommodating a power supply, wherein the first member includes:

a first lateral wall portion that is part of a lateral wall of the first tubular body and covers part of a peripheral edge of the circuit board accommodated inside the first tubular body; and a first divided connecting portion that is continuous with the first lateral wall portion and is part of the first connecting portion, and the second member includes:

a base that is disposed closing an other opening side of the first tubular body and on which a light source is placed;

a second lateral wall portion that is adjacent to a side end of the first lateral wall portion and continuous from the base, the second lateral wall portion is part of the lateral wall of the first tubular body, and the second lateral wall portion covers part of the peripheral edge of the circuit board accommodated inside the first tubular body; and a second divided connecting portion that is continuous with the second lateral wall portion, the second divided connecting part is part of the first connecting portion.

11. The portable lighting appliance according to claim 10, wherein the first connecting portion is attached to the first holding portion such that the first connecting portion is located on an inner side of the first holding portion, the second divided connecting portion includes part of a screw portion that engages with a screw structure of the first holding portion, and the first divided connecting portion has a contact surface that comes into contact with an inner peripheral end surface of the screw structure of the first holding portion.

12. The portable lighting appliance according to claim 10, wherein the first tubular body includes, on a peripheral edge of the base, a third holding portion that holds a third tubular body having a third tubular shape, and the third tubular body includes an accommodating portion and a third connecting portion that is continuous with the accommodating portion and is connected to the third holding portion, the accommodating portion accommodating a collimating lens that collimates light from the light source.

13. The portable lighting appliance according to claim 10, wherein the second member includes a first electrode that comes into contact with one electrode of a battery serving as the power supply in a direction in which an opening of the first tubular body is closed on an inner side of the first connecting portion, the first electrode serving as one of power supply electrodes, and the second tubular body includes a lid portion detachably attached to an opening of the second tubular body on a side opposite to the first holding portion via a second holding portion, and the lid portion includes:

a second connecting portion that is detachably connected to the second holding portion, and a second electrode that comes into contact with the other electrode of the battery, the second electrode serving as the other of the power supply electrodes.

14. The portable lighting appliance according to claim 10, wherein the second lateral wall portion includes a board support portion that supports the circuit board, and the board support portion includes:

a first support portion disposed along an inner peripheral surface of the second lateral wall portion, and a second support portion spaced apart from the first support portion in an axial direction of the first tubular body such that the circuit board can be supported, and the circuit board includes:

a first board supported by the first support portion, and a second board supported by the second support portion at a position spaced apart from the first board.

15. The portable lighting appliance according to claim 10, wherein the light source includes a laser diode.

16. The portable lighting appliance according to claim 11, wherein the light source includes a laser diode.

17. The portable lighting appliance according to claim 12, wherein the light source includes a laser diode.

18. The portable lighting appliance according to claim 13, wherein the light source includes a laser diode.

19. The portable lighting appliance according to claim 14, wherein the light source includes a laser diode.

20. A lighting appliance tubular body, comprising:

a first tubular body including a first member and a second member, the first tubular body having a first tubular shape when the first member and the second member are combined, the first tubular body including a first connecting portion on one opening side of the first tubular shape; and a second tubular body having a second tubular shape, the second tubular body including a first holding portion that holds the first connecting portion of the first tubular body, the second tubular body being configured to accommodate a power supply, wherein the first member includes:

a first lateral wall portion that is part of a lateral wall of the first tubular shape, the first lateral wall portion is configured to cover part of a peripheral edge of a circuit board when the circuit board is accommodated inside the first tubular shape; and a first divided connecting portion that is continuous with the first lateral wall portion and is part of the first connecting portion, the second member includes:

a base that is disposed closing an other opening side of the first tubular shape and on which a light source is placed;

a second lateral wall portion that is adjacent to a side end of the first lateral wall portion and continuous from the base, the second lateral wall portion is part of the lateral wall of the first tubular shape, and the second lateral wall portion is configured to cover part of the peripheral edge of the circuit board when the circuit board is accommodated inside the first tubular shape; and a second divided connecting portion that is continuous with the second lateral wall portion, the second divided connecting portion is part of the first connecting portion, the first tubular body includes, on a peripheral edge of the base, a third holding portion that holds a third tubular body having a third tubular shape, and the third tubular body includes an accommodating portion that accommodates a lens, and a third connecting portion that is continuous with the accommodating portion and is detachably connected to the third holding portion.

* * * * *